No. 724,739. PATENTED APR. 7, 1903.
W. ROBINSON.
VEHICLE BRAKE AND COASTER FOR CYCLES OR OTHER WHEELED VEHICLES.
APPLICATION FILED JAN. 7, 1903.
NO MODEL. 2 SHEETS—SHEET 1.
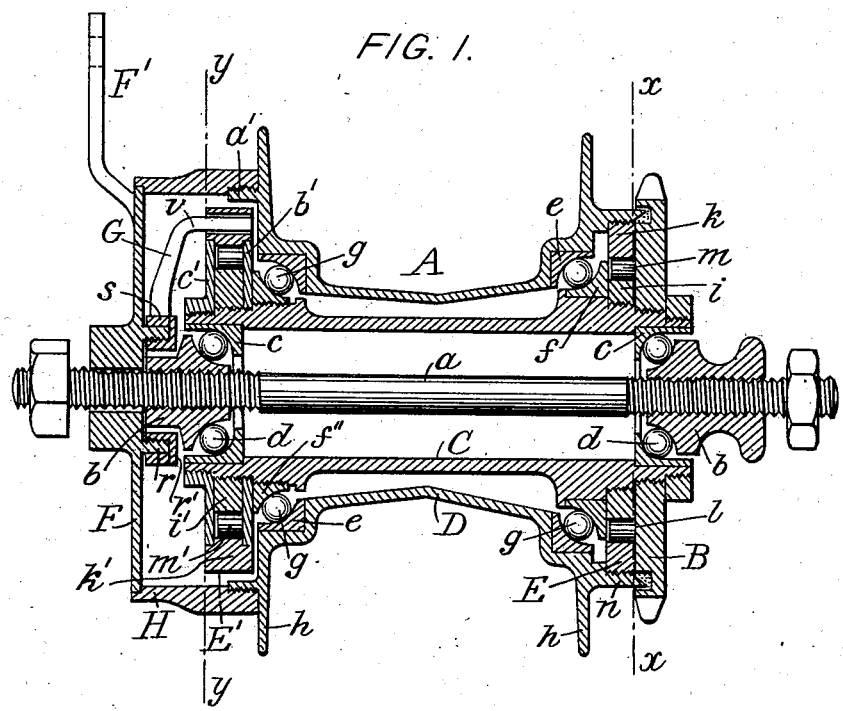
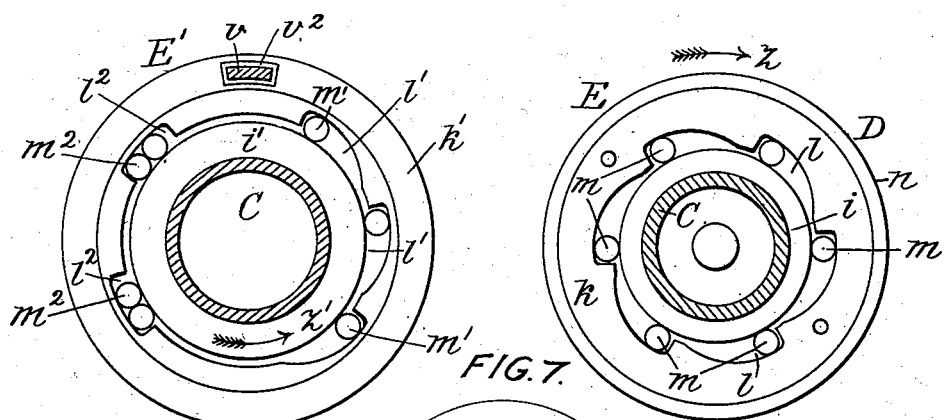
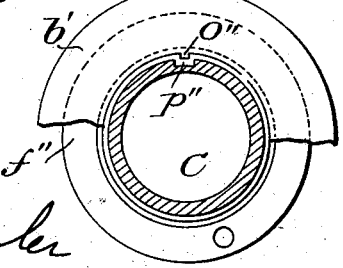
WITNESSES: INVENTOR No. 724,739. PATENTED APR. 7, 1903.
W. ROBINSON.
VEHICLE BRAKE AND COASTER FOR CYCLES OR OTHER WHEELED VEHICLES.
APPLICATION FILED JAN. 7, 1903.
NO MODEL. 2 SHEETS—SHEET 2.
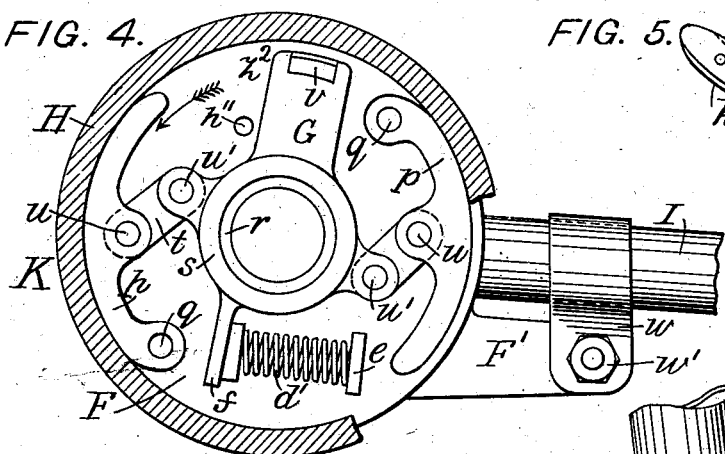
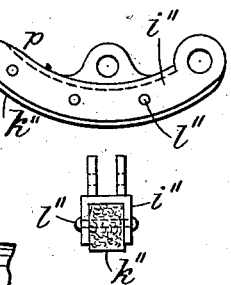
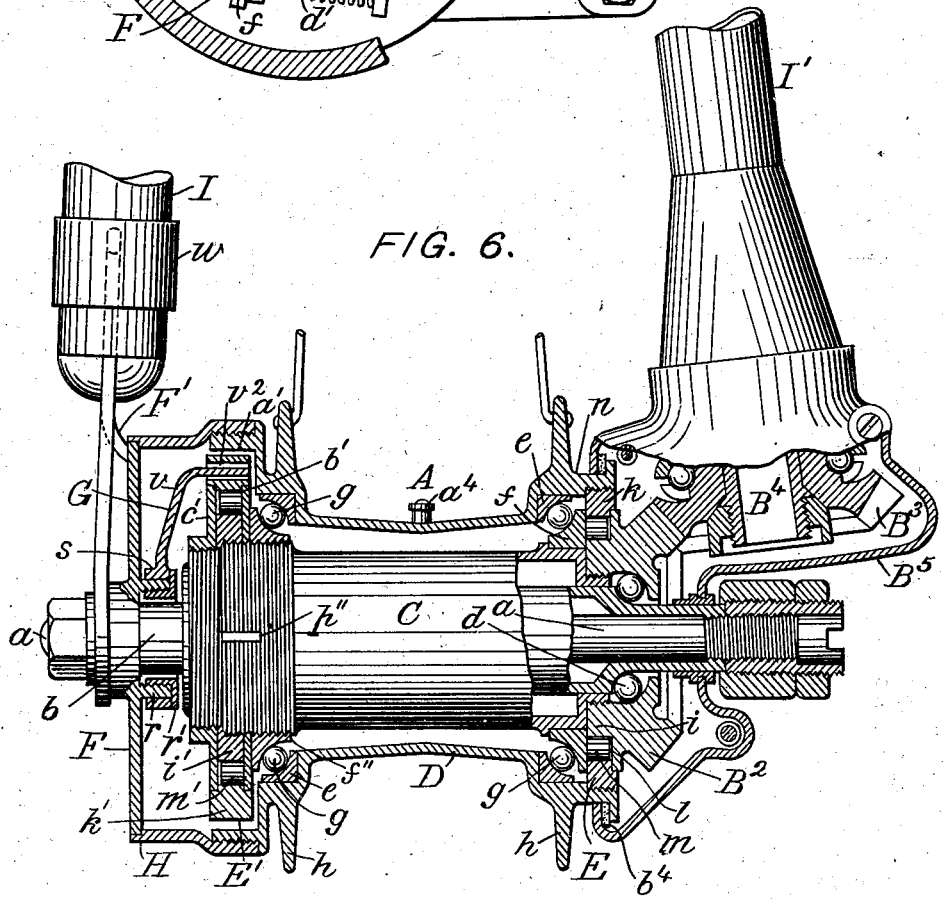
WITNESSES:
Geo. L. Fowler
Thomas Leak
INVENTOR
Wm. Robinson

UNITED STATES PATENT OFFICE.

WILLIAM ROBINSON, OF BROOKLYN, NEW YORK.

VEHICLE BRAKE AND COASTER FOR CYCLES OR OTHER WHEELED VEHICLES.

SPECIFICATION forming part of Letters Patent No. 724,739, dated April 7, 1903.

Original application filed September 18, 1899, Serial No. 730,817. Divided and this application filed January 7, 1903. Serial No. 138,150. (No model.)

*To all whom it may concern:*

Be it known that I, WILLIAM ROBINSON, a citizen of the United States, residing at Brooklyn, in the county of Kings and State of New York, have invented a new and Improved Vehicle Brake and Coaster for Cycles or other Wheeled Vehicles, of which the following is a specification.

The nature of my invention will be understood from the following description, reference being had to the accompanying drawings, which form a part of this specification, in which—

Figure 1 is a longitudinal sectional view of a coasting hub and brake embodying the main features of my invention. Fig. 2 is a section through the line $x\,x$, Fig. 1, showing the driving-clutch looking toward the right-hand end of the hub; and Fig. 3 is a section through the line $y\,y$, Fig. 1, showing the braking-clutch looking toward the left-hand end of the hub. Fig. 4 is a face view of the brake mechanism, partly in section, showing the brake-shoes in braking position. Fig. 5 shows a side view and a cross-section of the brake-shoe; and Fig. 6 is a view, partly in section, illustrating the application of my invention to a beveled-gear chainless bicycle. Fig. 7 is a detail illustrating the method of adjusting bearings.

A represents a bicycle-hub in which the axle $a$, provided with the cones $b$, is secured rigidly to the bicycle-frame in the usual manner. The sprocket B is rigidly secured to the inner hub or gear-sleeve C, which latter is provided with the cups $c$, between which and the axle-cones $b$ the rings of balls $d$ are placed. Thus the inner or continuous gear-sleeve C is arranged to revolve freely around the fixed axle $a$. The outer hub or sleeve D is provided on its interior at the ends with the cups $e$, while the inner or gear sleeve C is provided on its exterior with the corresponding cones $f\,f''$. Between these cups and cones rings of balls $g\,g$ are arranged. Thus when unobstructed the outer hub D is free to revolve on the inner sleeve C. The outer hub D is provided with flanges $h\,h$, to which the spokes are attached in any usual or suitable manner, and on this hub the wheel proper is built up.

The driving-clutch E for clutching the inner sleeve C and the outer hub D together is illustrated in Figs. 1 and 2, in which the hardened ring $i$, formed with a uniform peripheral surface, is secured to the inner sleeve C, while the outer ring $k$, provided on its inner periphery with the tapering recesses $l$, is securely screwed into the end of the outer hub D, as shown at $n$. Rollers $m$ are placed in the tapering recesses $l$. These rollers are held in proper alinement by the sprocket B on one side and the external cone $f$ on the other. It will be understood that when the inner sleeve C is caused to rotate forward in the direction of the arrow $z$ by the chain engaging and rotating the sprocket B forward this movement carries the rollers $m$ forward to the narrower part of the recesses $l$ in the ring $k$, thus clutching said inner and outer rings—that is, the inner sleeve C and the outer hub D—securely together. The wheel thus clutched to the inner sleeve C is driven forward by pedaling in the usual way. As soon, however, as pedaling ceases the chain, with its sprocket B and the inner sleeve C, becomes stationary. The hub D meanwhile continues revolving, its forward movement bringing the rollers $m$ into the widest part of the recesses $l$ and causing them to revolve around the inner member $i$ of the clutch. Thus the clutching ceases the instant pedaling ceases or is relaxed. When the wheel is coasting, in order to renew the clutching it is only necessary to renew the pedaling at a speed which will cause the inner sleeve C to revolve more rapidly than the wheel is actually coasting. Thus from coasting actual driving is renewed. It will be understood, therefore, that the clutching and unclutching, the coasting, and driving forward are automatic and interchangeable at will without other action than that of the feet on the pedals.

On the opposite end of the hub A are mounted the brake and the braking-clutch. The construction, application, and operation of these will be understood by reference to Figs. 1, 3, and 4, in which F represents the base-plate, on which the brake-shoes $p\,p$ are pivotally mounted at their ends, as shown at $q\,q$. The brake-lever G is rotatably mounted on the annular flange $r$, projecting inwardly from the inner side of said base-plate F. Said lever G is connected to the shoes $p\ p$ by the links $t\ t$, which are pivotally connected to said shoes at $u\ u$ and to lugs on said lever, as shown at $u'\ u'$. Said lever G is provided near its outer end with the inwardly-projecting lug $v$, and said lever is kept in proper rotatable position by the flanged ring $r'$, which is screwed into the ring $r$ and overlaps the bearing-ring $s$ of said lever G, as shown in Fig. 1. The baseplate F is provided with the projection or lug $F'$ and is held in a fixed position by the axle $a$, passing through its center, and the strap $w$, overlapping the left lower fork side I and engaging said lug $F'$, as shown at $w'$. The drum H is secured to the flange $a'$ on the end of the outer hub D, revolves with said drum, and overlaps and peripherally incloses the brake-shoes $p\ p$ and their connections. It is evident now that the movement of the lever G in one direction on its axis will apply the brake-shoes to the inner periphery of said drum H, as shown in Fig. 4, and thus control or arrest the coasting movement of the outer hub D—that is, of the wheel.

Leaving the brake for the present, I will now describe the braking-clutch $E'$, (illustrated in Figs. 1 and 3,) in which the inner member $i'$, provided with a uniform peripheral surface, is securely screwed upon the inner sleeve C and the outer ring $k'$ is provided on one side of its inner peripheral surface with the tapering recesses $l'$, in which are placed rollers $m'$. Said ring $k'$ is provided on the opposite side of its inner peripheral surface with the recesses $l^2$ of uniform depth throughout their length, and in each of these recesses is placed a plurality of rollers $m^2$. The outer member $k'$ of the brake-clutch $E'$ is also provided near its outer periphery with the slotted orifice $v^2$, through which the lug $v$ of the brake-lever G passes. The clutch elements $i'\ k'$ and their inclosed rollers are kept in proper relative position by the side plate $b'$ and the locking-plate $c'$, said member $k'$ fitting rotatably between said side plates.

The operation is as follows: In forward driving the sleeve C, with the inner member $i'$ of the clutch, revolves in the direction of the arrow $z'$, carrying the rollers $m'$ forward to the widest part of the recesses $l'$. The outer ring $k'$ meantime is held in a stationary position by the lug $v$ of the brake-lever G, passing through the slot $v^2$ of said ring $k'$. The brake mechanism, however, is unaffected, the brake-shoes remaining in their normal released position. The same is true when pedaling ceases, and the wheel is allowed to coast. To apply the brake, the pedals are carried backward slightly. This movement causes the sleeve C, with its ring $i'$, to rotate backward, thus carrying the rollers $m'$ back to the narrower part of the tapering recesses $l'$ and clutching the outer and inner rings $k'$ $i'$ firmly together. A further backward movement now rotates the outer ring $k'$ with the lug $v$ of the brake-lever G backward in the direction of the arrow $z^2$—that is, the brake-lever G is rotated on its axis in the direction of said arrow $z^2$—thus applying the brakes with greater or less force, according to the backward pressure exerted on the pedals. It will be observed that owing to the toggle-jointed construction of the brake mechanism and the method of applying the leverage it is impossible for the brake-shoes to stick to the drum H when the braking pressure is removed. When this pressure ceases, a slight forward movement of the wheel will usually throw the shoes off free from contact with said drum H. Nevertheless as a precaution I prefer to use a light release-spring $d'$, one end of which has a bearing against the fixture or stop $e'$ of the plate F and the other end against the lug $f'$ of the brake-lever G.

In the clutch $E'$ the outer ring $k'$, being held in position by the lug $v$ of the brake-lever G, has but slight rotary motion. I therefore connect this ring to the brake-lever in such a relative position that the tapering recesses will have their narrow ends toward the bottom and their wide ends at the top of the slots. Thus gravity causes the rollers $m'$ to clutch instantly and without lost motion. Tapering recesses on the opposite side of the ring $k'$ would be of no advantage in this case, since gravity would keep the rollers always in the wide part of the slots. I therefore make the slots $l^2$ of uniform depth throughout their length and put a plurality of rollers in each slot on this side of the clutch. Again, I leave space between the clutch members $i'\ k'$, as shown, so that there can be no frictional contact between these members. By the arrangement above described it is evident that the antifriction-bearings between said members $i'\ k'$ are such as to reduce to a minimum the liability of said clutch to lock and stick when braking pressure is relaxed.

The hub D is provided with the flanges $h$ for the spokes.

Fig. 5 shows the brake-shoe, which consists, essentially, of the metallic case or base $i''$, provided with the wearing-block $k''$, made of cork, wood, or other suitable non-metallic substance, formed into proper shape and riveted or otherwise secured in position in the groove or receptacle of said metal part, as by the pins $l''$, as shown.

To adjust the bearings between the sleeve C and the other hub D, the cone $f''$ is screwed into a position properly adjusting said bearings. The sleeve C is provided outside of said cone with a longitudinal groove $p''$, Figs. 6 and 7, and the plate $b'$ with a corresponding projection or tooth $o''$ on its inner periphery, said tooth fitting into said groove $p''$, thus preventing said plate $b'$ from having independent rotation. When the cone $f''$ is adjusted, therefore, to proper position, the said plate $b'$ is slipped into position against said cone, said tooth and groove keeping said plate from rotating relatively to the sleeve C. The inner member $i'$ of the braking-clutch $E'$ is now screwed into place against said plate $b'$.

Thus said plate $b'$ answers the double purpose of a side or retaining plate for the clutch E' and of a locking-plate preventing the cone $f''$ from turning after it is properly adjusted.

I have heretofore described the coasting and braking hub (shown in Fig. 1) in connection with chain-driven wheels; but it is evident that by substituting beveled or other suitable gearing for the sprocket this coasting and braking hub is equally adapted for use in chainless machines.

In Fig. 6 I illustrate the application of my invention to a beveled-gear chainless bicycle, in which the beveled gear $B^2$, substituted for the sprocket B of Fig. 1, is securely fastened to the gear-sleeve C, as shown. The rear portion of this driving-gear $B^2$ forms the annular inner seat $i$ for the rollers $m$. The beveled gear $B^2$ meshes with the beveled gear $B^3$, which is rigidly secured to the driving-shaft $B^4$. Thus when the driving-shaft $B^4$, with its gear $B^3$, is turned in the proper direction the action of said gear $B^3$ on the sleeve-gear $B^2$ rotates the latter in a forward direction, thus actuating the clutch E and driving the hub or wheel A forward, as already described in connection with the chain-driven wheel.

From the foregoing description and the illustration it will be seen that my invention is equally as applicable to a chainless as to a chain-driven machine.

I do not herein claim, broadly, a coasting and braking wheel-hub provided at one end with a driver and at the opposite end with a brake, means for clutching the driver and hub together for driving and releasing the same for coasting, and means for actuating said brake by back pedaling, as the same is disclosed in my application filed October 8, 1897, Serial No. 654,532, and in my application filed November 15, 1897, Serial No. 658,638, and I reserve the right to claim the subject-matter of such disclosure in either of my said applications.

Having thus described my invention, what I claim as new, and desire to secure by Letters Patent, is—

1. A coasting-hub consisting, essentially, of a supporting-shaft, a driving or gear sleeve rotatably supported at a plurality of points thereon, an outer or wheel hub rotatably supported on said gear-sleeve and provided with a braking-surface, a brake applicable thereto, a braking-clutch having its component members concentrically mounted within said hub, said clutch being arranged to actuate said brake, and means for automatically clutching together said gear-sleeve and outer hub for driving the wheel and unclutching the same for coasting.

2. A coasting-hub consisting, essentially, of a supporting-shaft, a driving or gear sleeve rotatably supported at a plurality of points thereon, an outer or wheel hub rotatably supported on said gear-sleeve and provided at one end with a brake-drum, a brake applicable to said brake-drum, a braking-clutch mounted within said hub and having its component members concentric therewith, said clutch being arranged to operate said brake, and means for automatically clutching together said gear-sleeve and outer hub for driving the wheel and unclutching the same for coasting.

3. A coasting-hub consisting, essentially, of a supporting-shaft, a driving or gear sleeve rotatably supported at a plurality of locations thereon, and provided at one end with a driver, an outer or wheel hub rotatably mounted on said gear-sleeve and provided with a brake-drum located at the opposite end of the hub from the driver, a brake applicable to said brake-drum, a braking-clutch mounted within said hub, having its component members concentric therewith, and arranged to apply the brake to said drum, and means for automatically clutching together and unclutching said gear-sleeve and outer hub.

4. A coasting-hub consisting, essentially, of a supporting-shaft, a driving or gear sleeve rotatably supported thereon and provided at one end with a driver, an outer or wheel hub wholly supported rotatably on said gear-sleeve and provided with a brake-drum located at the opposite end of the hub from the driver, a brake applicable to said brake-drum, a braking-clutch having its members mounted concentrically within said hub and arranged to apply said brake to said brake-drum, and means for automatically clutching together and unclutching said gear-sleeve and outer hub.

5. A coasting and braking hub consisting, essentially, of a supporting-shaft, a driving or gear sleeve rotatably supported thereon, an outer or wheel hub wholly supported rotatably on said gear-sleeve, means for automatically clutching together and unclutching said gear-sleeve and outer hub, a driving sprocket or gear secured to one end of said gear-sleeve, brake mechanism arranged at the opposite end of said hub, a brake-clutch mounted within said hub and having its members concentric therewith and arranged to control said brake mechanism, and means for operating said brake by the backward rotation of the crank-shaft.

6. A coasting and braking hub consisting, essentially, of a supporting-shaft, a driving or gear sleeve supported rotatably at a plurality of locations thereon, an outer or wheel hub, supported rotatably on said gear-sleeve, means for automatically clutching together and unclutching said gear-sleeve and outer hub, a driving sprocket or gear secured to one end of said gear-sleeve, a brake arranged at the opposite end of said hub, a brake-clutch having its members mounted concentrically within said hub and in operative relation to said brake, and means for actuating said brake by the backward rotation of the crank-shaft.

7. In a bicycle-hub the combination with a driving-sleeve and a driven sleeve provided with a braking-drum, both sleeves extending practically from one end to the other of the hub, of a brake applicable to said drum, a brake-clutch having its members mounted concentrically within said driven sleeve and in operative relation to said brake, and a clutch which connects the driven sleeve with the driving-sleeve when the latter is moved forward and disconnects said sleeves when the driving-sleeve is held stationary or moved backward.

8. In a device of the character described, the combination with the inner and outer continuous sleeves, the latter provided with a braking-drum, of means for driving the inner sleeve, independent ball-bearings for each end of said sleeve, a driving and a braking clutch between the two sleeves and having their members concentric with said sleeves, and means for applying a brake to said braking-drum.

9. In a cycle, the combination with the rear shaft, of a wheel having its hub comprising two independent continuous sleeves extending from end to end of said hub, the outer sleeve being provided with a braking-drum and having connections for the spokes, and the inner sleeve having means at one end whereby it may be rotated, driving and clutching devices intermediate said sleeves and having their members concentric therewith, and means for applying a brake to said braking-drum.

10. In a cycle, the combination with the rear axle, of an inner sleeve adapted to rotate thereon and to which power is applied, an outer sleeve provided with a braking-drum and having spoke connections, both of said sleeves being continuous from end to end of the hub, independent bearings for said sleeves, driving and braking clutch devices intermediate said sleeves and having their component members concentric therewith, and means for applying a brake to said braking-drum.

11. The combination with a wheel-hub, of a brake mechanism located at one end of the hub and a driver located at the opposite end of the hub, a sleeve connected with the driver and projected within the hub and arranged to bear at more than one point on the supporting-shaft, and clutch devices for connecting the driver and sleeve with the hub for driving the wheel, or with the brake mechanism to apply the brake, said clutch devices being located within and having their members concentric with, said hub.

12. In a bicycle, the combination with a supporting-axle and a wheel-hub, of a driver provided with a connected sleeve mounted upon the axle and projected within the hub, said sleeve being supported at a plurality of locations on said supporting-axle, a brake mechanism comprising a brake-actuator, and clutching devices for connecting the driver-sleeve with the hub or the brake-actuator, said clutch devices being mounted within, and having their component members concentric with, said hub.

13. In a bicycle, the combination with a supporting-axle and a wheel-hub, of a driver located at one end of the hub and a brake mechanism located at the opposite end of the hub, a sleeve connected to the driver and projected laterally within the hub, said sleeve bearing at a plurality of points on said supporting-axle, and a clutch connection between the said sleeve and the brake mechanism, said clutch being located within, and having its component members concentric with, said hub.

14. A coasting-hub consisting, essentially, of a supporting-shaft, a driving or gear sleeve rotatably mounted thereon, and provided at one end with a driver, an outer or wheel hub rotatably mounted on said gear-sleeve and provided with a brake-drum located at the opposite end of the hub from the driver, a braking-clutch comprising concentric members provided with a clutch-pawl between the same, said clutch being mounted upon said gear-sleeve in suitable relation to said brake-drum to coöperate therewith in braking, and means for automatically clutching together and unclutching said gear-sleeve and outer hub.

15. A coasting-hub consisting, essentially, of a supporting-shaft, a driving or gear sleeve rotatably mounted thereon and provided at one end with a driver, an outer or wheel hub bearing rotatably on said gear-sleeve and provided with a brake-drum located at the opposite end of the hub from the driver, a braking-clutch embodying concentric members with a clutch-pawl between the same, said clutch being mounted upon said gear-sleeve within the lines of said brake-drum and in suitable relation thereto to coöperate therewith in braking, and means for automatically clutching together and unclutching said gear-sleeve and outer hub.

16. A coasting-hub consisting, essentially, of a supporting-shaft, a driving or gear sleeve rotatably mounted thereon and provided at one end with a driver, an outer or wheel hub wholly supported rotatably on said gear-sleeve and provided with a brake-drum located at the opposite end of the hub from the driver, a braking-clutch embodying concentric members with a clutch-pawl between the same, said clutch being mounted upon said gear-sleeve in suitable relation to said brake-drum to coöperate therewith in braking, and means for automatically clutching together and unclutching said gear-sleeve and outer hub.

17. In a bicycle, the combination with a supporting-axle and a wheel-hub, of a driver provided with a connected sleeve mounted upon the axle and projected within the hub, a brake mechanism comprising a brake-actuator, and clutch devices for connecting the driver-sleeve with the hub or the brake-actuator, the braking-clutch device comprising concentric members provided with a clutch-pawl between the same.

18. A coasting-hub consisting, essentially, of a supporting-shaft, a driving or gear sleeve rotatably supported thereon and provided at one end with a driver, an outer or wheel hub supported rotatably on said gear-sleeve and provided with a braking-surface, a braking-clutch comprising concentric members provided with a clutch-pawl between the same, said clutch being located within said wheel-hub in suitable relation to said braking-surface to coöperate therewith in braking, and means for automatically clutching together and unclutching said gear-sleeve and outer hub.

19. A coasting-hub consisting, essentially, of a supporting-shaft, a driving or gear sleeve supported rotatably thereon and provided at one end with a driver, an outer or wheel hub bearing rotatably on said gear-sleeve and provided with a braking-surface, a braking-clutch embodying concentric members with a clutch-pawl between the same, said clutch being located within said hub in juxtaposition to said braking-surface and in suitable relation thereto to coöperate therewith in braking, and means for automatically clutching together and unclutching said gear-sleeve and outer hub.

WILLIAM ROBINSON.

Witnesses:
C. H. LAMBERT,
W. A. TRASK.